United States Patent
Lu et al.

(10) Patent No.: US 8,384,338 B2
(45) Date of Patent: Feb. 26, 2013

(54) SYSTEM AND METHOD FOR DETERMINING STATOR WINDING RESISTANCE IN AN AC MOTOR USING MOTOR DRIVES

(75) Inventors: Bin Lu, Kenosha, WI (US); Thomas G. Habetler, Snellville, GA (US); Pinjia Zhang, Atlanta, GA (US)

(73) Assignee: Eaton Corporation, Cleveland, OH (US)

(*) Notice: Subject to any disclaimer, the term of this patent is extended or adjusted under 35 U.S.C. 154(b) by 541 days.

(21) Appl. No.: 12/363,413

(22) Filed: Jan. 30, 2009

(65) Prior Publication Data

US 2010/0194329 A1 Aug. 5, 2010

(51) Int. Cl.
*H02P 23/00* (2006.01)

(52) U.S. Cl. ........ 318/811; 318/727; 318/490; 318/813; 318/801; 318/798; 324/765.01; 702/85; 702/183

(58) Field of Classification Search .................. 318/811, 318/727, 802, 805, 806, 183, 798, 609, 801, 318/632, 813, 608, 490; 702/183, 85; 363/71, 363/97; 324/765.01
See application file for complete search history.

(56) References Cited

U.S. PATENT DOCUMENTS

| | | | |
|---|---|---|---|
| 4,083,001 A | | 4/1978 | Paice |
| 4,713,745 A * | | 12/1987 | Schauder ..................... 363/161 |
| 5,502,360 A * | | 3/1996 | Kerkman et al. ............. 318/805 |
| 5,510,687 A * | | 4/1996 | Ursworth et al. ............. 318/727 |
| 6,042,265 A | | 3/2000 | Kliman et al. |
| 6,069,467 A * | | 5/2000 | Jansen ........................... 318/802 |
| 6,137,258 A * | | 10/2000 | Jansen ........................... 318/802 |
| 6,621,291 B2 * | | 9/2003 | Lee et al. .................. 324/765.01 |
| 6,847,187 B2 | | 1/2005 | Kumar |
| 7,184,902 B2 | | 2/2007 | El-Ibiary |
| 7,759,897 B2 * | | 7/2010 | Piippo ........................... 318/700 |
| 7,969,112 B2 * | | 6/2011 | Piippo ........................... 318/609 |
| 2003/0062870 A1 * | | 4/2003 | Royak et al. .................. 318/727 |
| 2004/0080333 A1 * | | 4/2004 | Klein ............................. 324/772 |
| 2005/0040924 A1 * | | 2/2005 | LaBoube et al. ................. 336/5 |
| 2005/0067991 A1 * | | 3/2005 | El-Ibiary ....................... 318/490 |
| 2007/0189044 A1 * | | 8/2007 | Liu et al. ......................... 363/34 |
| 2009/0051311 A1 * | | 2/2009 | Lu et al. ........................ 318/806 |

FOREIGN PATENT DOCUMENTS

| KR | 20070048522 A |   | 5/2007 |
|---|---|---|---|
| KR | 20070048522 A | * | 5/2007 |

* cited by examiner

*Primary Examiner* — Walter Benson
*Assistant Examiner* — Jorge Carrasquillo
(74) *Attorney, Agent, or Firm* — Ziolkowski Patent Solutions Group, SC (57) ABSTRACT

A system and method for determining the stator winding resistance of AC motors is provided. The system includes an AC motor drive having an input connectable to an AC source and an output connectable to an input terminal of an AC motor, a pulse width modulation (PWM) converter having switches therein to control current flow and terminal voltages in the AC motor, and a control system connected to the PWM converter. The control system generates a command signal to cause the PWM converter to control an output of the AC motor drive corresponding to an input to the AC motor, selectively generates a modified command signal to cause the PWM converter to inject a DC signal into the output of the AC motor drive, and determines a stator winding resistance of the AC motor based on the DC signal of at least one of the voltage and current.

23 Claims, 8 Drawing Sheets

SYSTEM AND METHOD FOR DETERMINING STATOR WINDING RESISTANCE IN AN AC MOTOR USING MOTOR DRIVES

GOVERNMENT LICENSE RIGHTS

The present invention was made at least in part with Government support under Contract No. DE-FC36-04GO14000, awarded by the United States Department of Energy. The Government may have certain rights in the invention.

BACKGROUND OF THE INVENTION

The present invention relates generally to alternating current (AC) induction motors and, more particularly, to a system and method for determining the stator winding resistance of AC motors by way of a motor drive, for thermal protection of AC motors, improving motor control performances, and condition monitoring of AC motors.

The usage of motor drives in various industries has recently become more prevalent based on the increasing need for energy savings and control flexibility in motor operation. Based on these needs, improvements in motor control performance have become increasingly important. One factor of improved motor control performance is the accuracy of motor parameter estimation, which is of great importance to the overall control performance of motor drives. Among the plurality of motor parameters that might be estimated, such as stator and rotor resistances, stator and rotor leakage inductances, magnetic inductance, etc., stator resistance is the most difficult parameter to be identified because of its small per unit value. However, the accuracy of stator resistance estimation is essential to accurately determining a plurality of related motor parameters. For example, an accurate estimation of stator resistance allows for the further estimation of rotor/stator flux, rotor speed, air-gap torque, stator copper loss, and other similar parameters. The accurate estimation of stator winding resistance is thus beneficial for motor controls and is widely used in motor condition monitoring, fault diagnostics and prognostics, and instantaneous efficiency evaluation.

Another known use for the estimated stator winding resistance is for determining stator winding temperature, which can be used for thermal protection of the motor. Thermal protection is an important aspect in the monitoring of motor conditions, as the thermal stress on the stator winding is considered to be one of the main reasons for stator winding insulation failure. It is commonly assumed that the motor's life is reduced by 50% for every 10° C. increase in temperature above an acceptable stator winding temperature limit. Therefore, accurate monitoring of the stator winding temperature is beneficial for motor protection purposes.

Various methods for determining the stator winding temperature have been proposed to estimate the average winding temperatures from the stator winding resistances. Over the years, various stator winding resistance estimation methods have been proposed for different purposes. Generally, they are divided into three major categories: direct measurement methods, equivalent circuit-based methods, and signal-injection-based methods. Direct methods, such as the IEEE standard-118, give the most accurate stator resistance estimates, but have limitations and drawbacks due to the fact that resistance is only measured at a certain temperature and the resistance variations due to temperature changes are not considered. A further drawback of direct measurement methods is that the motor has to be disconnected from service to perform the required tests.

The equivalent circuit-based methods of $R_s$ estimation use the motor current and voltage to calculate the stator resistance based on an AC motor equivalent circuit (i.e., a model of the AC motor). Such model-based methods are non-intrusive and can respond to changes in the cooling conditions but are generally too sensitive to motor parameter variations to provide accurate $R_s$ estimation, due to the fact that the motor parameters may vary under different conditions, such as operating speed, magnetic saturation, etc. That is, the estimation error of model-based methods can be larger than 20%. Thermal parameter variation and the difficulty of thermal parameter identification may lead to further inaccuracy in model-based methods.

The signal injection-based methods for determining stator resistance inject a DC bias into the stator supply voltage and use the DC component of the voltage and current to calculate the stator resistance. In one DC signal injection method, a resistor in parallel with a transistor is installed in one phase of the motor, which leads to an equivalent resistance in the induction motor that is different when input current is positive and negative, thus producing a DC component. Although this approach can be accurate and robust to the variations in cooling conditions and motor parameters, it suffers from its intrusive nature, as an extra DC signal injection circuit needs to be installed in series with one of the motor leads. Additionally, due to the current limits of semiconductor devices, previous signal injection-based methods cannot generally be directly applied to motors beyond 100 hp.

It would therefore be desirable to design an accurate, non-intrusive method for determining stator winding resistance. It would further be desirable to use an existing device to inject the DC component for determining stator resistance, and accordingly, to estimate the stator winding temperature.

BRIEF DESCRIPTION OF THE INVENTION

The present invention provides a system and method for determining the stator winding resistance of AC motors by way of a motor drive. Determination of the stator winding resistance provides for thermal protection of AC motors, improved motor control performance, and condition monitoring of AC motors.

In accordance with one aspect of the invention, a system to estimate resistance of a stator winding of an AC motor includes an AC motor drive having an input connectable to an AC source and an output connectable to an input terminal of an AC motor. The AC motor drive further includes a pulse width modulation (PWM) converter having a plurality of switches therein to control current flow and terminal voltages in the AC motor and a control system connected to the PWM converter. The control system is configured to generate a command signal to cause the PWM converter to control an output of the AC motor drive corresponding to an input to the AC motor, selectively generate a modified command signal to cause the PWM converter to inject a DC signal into the output of the AC motor drive, and determine a stator winding resistance of the AC motor based on the DC signal of at least one of the voltage and current.

In accordance with another aspect of the invention, a method for determining resistance of a stator winding of an AC motor includes the step of providing an AC motor drive in series between an AC power source and the AC motor, the AC motor drive including a pulse width modulation (PWM) converter to condition voltage and current to the AC motor. The method also includes the step of selectively operating the AC motor drive in a standard mode and a DC injection mode, wherein operating the AC motor drive in the DC injection mode includes the steps of adding a DC command to at least one of an AC voltage command and an AC current command to form a composite command, generating a switching pattern for the PWM converter based on the composite command, and operating the PWM converter according to the switching pattern to introduce a DC signal into the AC motor voltage and current. Operating the AC motor drive in the DC injection mode further includes the steps of measuring the DC signal in at least one of the voltage and current provided to the AC motor and determining the resistance of the stator winding based on the measured DC signal.

In accordance with yet another aspect of the invention, an AC motor drive configured to control transmission of voltage and current from an AC power source to an AC motor having a stator winding is provided. The AC motor drive includes a pulse width modulation (PWM) converter to condition an AC motor line voltage and phase current to the induction motor, the PWM converter comprising a plurality of switches and being configured to operate according to a space vector modulation (SVM) control scheme to control the plurality of switches. The AC motor drive also includes a control system configured to selectively modify the SVM control scheme for the PWM converter to inject a DC signal into the AC motor line voltage and phase current and determine the resistance of the stator winding based on the DC signal.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The embodiments of the invention set forth herein relate to a system and method for remote stator winding resistance estimation for thermal protection of induction motors. An AC motor drive is controlled to inject a DC signal into an AC motor line voltage and phase current to the induction motor. A reference voltage and/or reference current command generated by a control system in the AC motor drive is modified to include a DC command therein, thereby modifying a control scheme for a pulse width modulation (PWM) converter in the AC motor drive to inject the DC signal into the AC motor line voltage and phase current. This DC signal is analyzed to determine a stator winding resistance.

Figure 1:
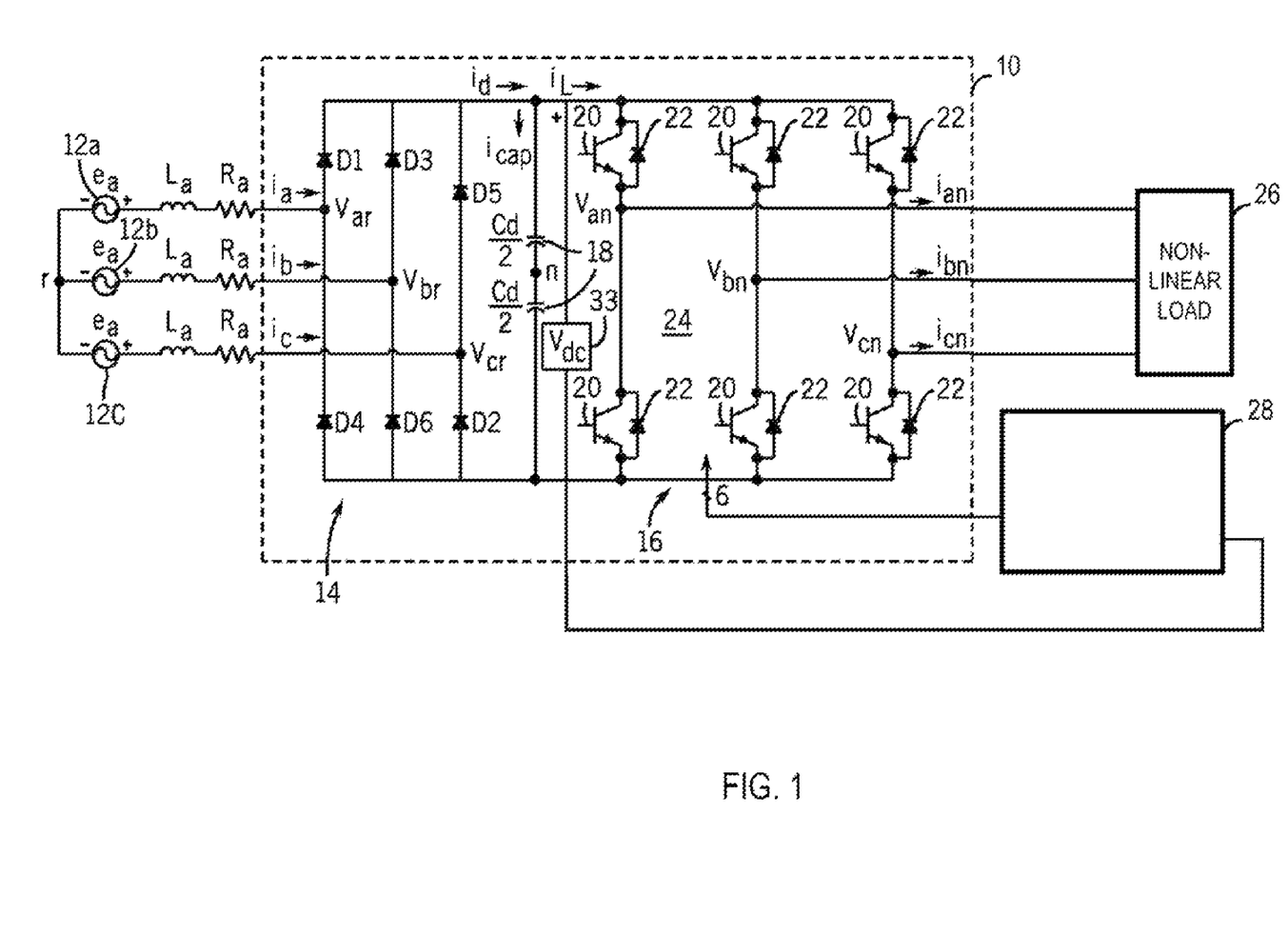
FIG. 1 a schematic of an AC motor drive according to one aspect of the invention.

Embodiments of the invention are directed to AC motor drives encompassing a plurality of structures and control schemes. The general structure of an AC motor drive 10 is shown in FIG. 1. The motor drive 10 may be configured, for example, as an adjustable speed drive (ASD) designed to receive a three AC power input, rectify the AC input, and perform a DC/AC conversion of the rectified segment into a three-phase alternating voltage of variable frequency and amplitude that is supplied to a load. In a preferred embodiment, the ASD operates according to an exemplary volts-per-hertz characteristic. In this regard, the motor drive provides voltage regulation of ±1% in steady state with less than 3% total harmonic distortion, ±0.1 Hz in output frequency, and fast dynamic step load response over a full load range.

In an exemplary embodiment, a three-phase AC input 12a-12c is fed to a three-phase rectifier bridge 14. The input line impedances are equal in all three phases. The rectifier bridge 14 converts the AC power input to a DC power such that a DC bus voltage is present between the rectifier bridge 14 and a switch array 16. The bus voltage is smoothed by a DC bus capacitor bank 18. The switch array 16 is comprised of a series of IGBT switches 20 and anti-parallel diodes 22 that collectively form a PWM inverter 24. The PWM inverter 24 synthesizes AC voltage waveforms with a fixed frequency and amplitude for delivery to a load, such as an induction motor 26. Operation of the inverter 24 is via a control system 28, which may further be comprised of a plurality of PID controllers each having a system layer and a programmable application layer that perform high speed operations such as space-vector modulation, DC bus voltage decoupling, and protection, for example. The control system 28 interfaces to the PWM inverter 24 via gate drive signals and sensing of the DC bus voltage and pole currents (by way a voltage sensor 33 for example) such that changes in DC bus voltage can be sensed. These voltage changes can be interpreted as transient load conditions and are used to control switching of the switch array 16 of PWM inverter 24 such that near steady-state load conditions are maintained.

Figure 2:
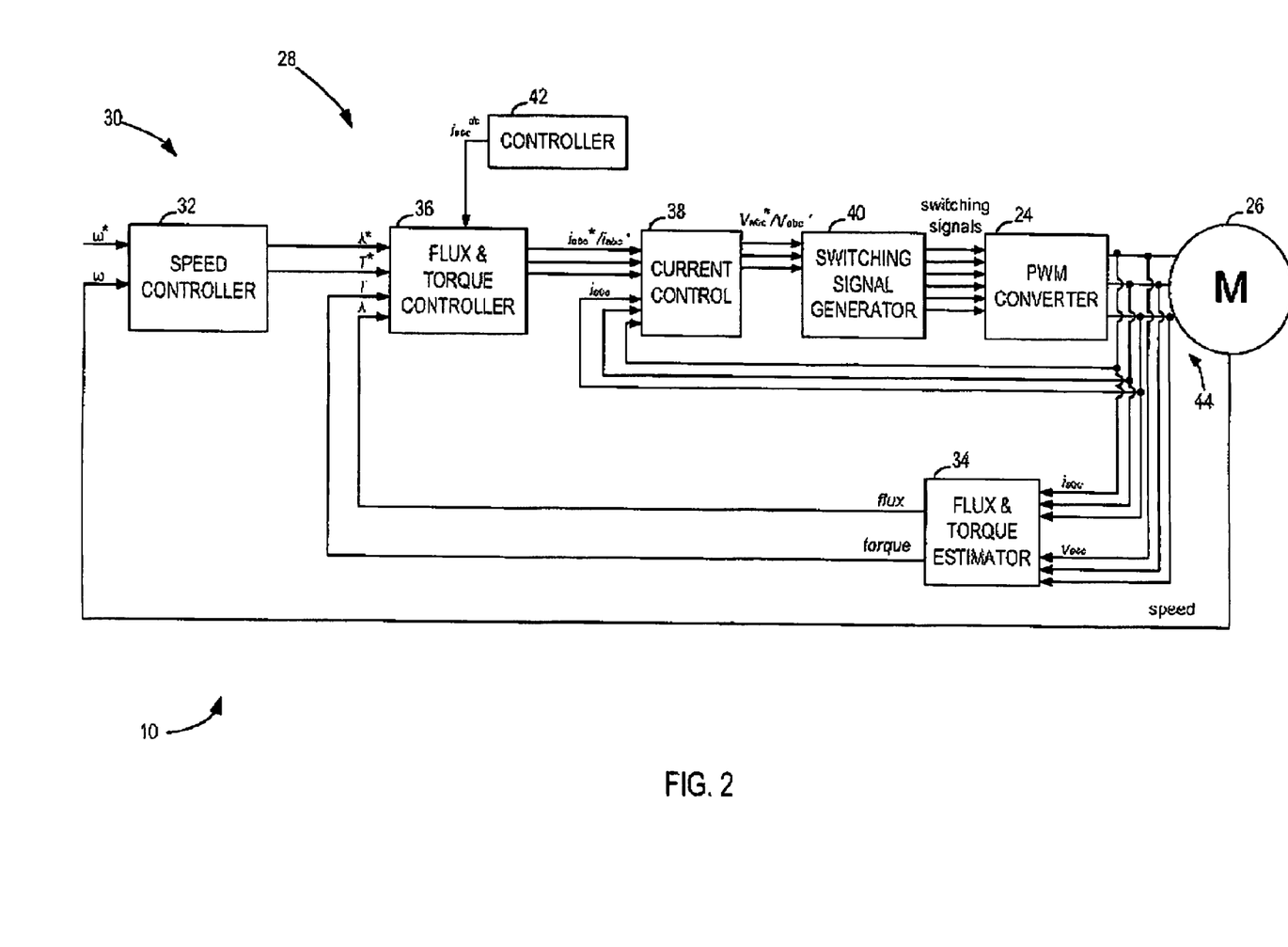
FIG. 2 is a schematic view of a closed-loop control scheme for DC injection for the motor drive of FIG. 1 according to an embodiment of the invention.

Embodiments of the invention are described below for both closed-loop and open-loop control of the motor drive 10. Referring first to FIG. 2, a general closed-loop scheme 30 of motor control for motor drive 10 is shown according to an embodiment of the invention. In an exemplary embodiment for the closed-loop scheme, the control system 28 of motor drive 10 includes a speed controller 32 that generates a desired flux $\lambda^*$ and torque command $T^*$ based on a speed command $\omega^*$ received from an input device (not shown) and a measured or estimated rotor speed $\omega$. A flux/torque estimator 34 is also included in the control system 28 of motor drive 10 and estimates a flux λ and torque T of the induction motor 26 using measured three-phase voltages $V_{abc}$ and currents $I_{abc}$. The desired flux λ* and torque command T* and the estimated flux λ and torque T of the induction motor 26 are output by the speed controller 32 and the flux/torque estimator 34, respectively, to a flux/torque controller 36, which generates a stator current command $I_{abc}$* based on the estimated λ and T, the flux command λ*, and torque command T*. A current controller 38 receives the stator current command $I_{abc}$* along with a measured stator current $I_{abc}$ to generate a stator voltage command $V_{abc}$*. The stator voltage command $V_{abc}$* is relayed to a switching signal generator 40 that, based on the stator voltage command $V_{abc}$*, generates a plurality of switching signals (i.e., a switching pattern) for controlling switching of the array of switches in the PWM converter 24. Based on the switching pattern generated by the switching signal generator 40, the PWM inverter 24 synthesizes AC voltage waveforms with a fixed frequency and amplitude for delivery to induction motor 26.

Also included in control system 28 of motor drive 10 is a controller 42. According to an embodiment of the invention, controller 42 is configured to selectively generate a DC current command signal for transmission to the flux/torque controller 36. The selective generation of the DC current command signal by controller 42 allows for motor drive 10 to alternate between operation in a standard mode and a DC injection mode. During standard operation of AC motor drive 10, controller 42 is in a deactivated state such that no DC command signal is generated thereby. The standard mode thus is considered the "normal" mode of operation for the AC motor drive 10. Controller 42 is further configured/programmed to selectively operate the motor drive 10 in the DC injection mode to inject a DC signal or component into the motor line voltages and phase current. During the DC injection mode, controller 42 operates to generate a DC command in the form of a DC current command that is transmitted to the flux/torque controller 36. That is, with reference to FIG. 2, for a closed-loop current-control voltage-fed motor drive, the DC command is introduced or added to the flux/torque controller 36 to modify the current command $i_{abc}$*.

When a DC current command is generated and added by controller 42 to flux/torque controller 36, the flux/torque controller 36 generates a modified current command $i_{abc}'$ (i.e., composite current command), which is described as:

$$i_{abc}'=i_{abc}*+i_{abc}^{dc} \quad [\text{Eqn. 1}],$$

where $i_{abc}'$ is the new current command with DC current command injected, $i_{abc}^{dc}$ is the DC current command as stated, and $i_{abc}$* is the current command generated by flux/torque controller 36. Responsive to the modified current command $i_{abc}'$ generated by flux/torque controller 36, current controller 38 is caused to generate a modified voltage command $V_{abc}'$ responsive thereto.

Based on the DC current command $i_{abc}^{dc}$ generated/added by controller 42, a modified current command $i_{abc}'$ and resulting modified voltage command $V_{abc}'$ are generated by control system 28. The resulting modified voltage command $V_{abc}'$ causes a modification to the switching pattern generated by the switching signal generator 40. That is, the switching pattern generated by the switching signal generator 40 for controlling of the PWM converter 24 when a DC current command $i_{abc}^{dc}$ is added by controller 42 (forming a resulting modified voltage command $V_{abc}'$) is modified as compared to the switching pattern generated by the switching signal generator 40 during standard operation of the motor drive 10. In the standard mode, the switching pattern generated by the switching signal generator 40 controls the PWM converter 24 to generate a controlled AC motor line voltage and phase current for the motor. In the DC injection mode, the modified switching pattern generated by the switching signal generator 40 controls the PWM converter 24 to inject a DC signal/component into the AC motor line voltage and phase current of induction motor 26. The frequency and/or timing of switching in the PWM converter 24 is controlled according to the modified switching pattern to cause a disturbance or distortion (i.e., a shift in the phase current and a notch in the line voltage) of at least one of the phases of the AC motor 26, which generates or injects a DC component into the motor line voltages and phase currents. These DC components can be measured and determined for each DC injection mode period by voltage and/or current sensors 44 included in motor drive 10.

In the above described closed-loop control scheme, it is recognized that the effect of the injected DC signal on the speed control must be eliminated. Accordingly, the motor speed is sampled at a low sampling frequency with a low-pass filter (not shown), whereby the speed oscillation can be removed by the low-pass filter. The effect of the injected DC signal on the flux/torque estimator 34 should also be eliminated, to avoid instability, by removing the DC component of the stator three-phase voltages and currents fed to the flux/torque estimator 34.

It is also recognized that the control method in control system 28 and the flux/torque estimation method may vary for different types of AC motor closed-loop control. Also, for different types of closed-loop control methods, the estimated flux may be stator flux, rotor flux, and linkage flux; the three-phase voltages and currents may also be denoted using different types of transforms in different reference frames, such as synchronous reference frame, rotor reference frame, stationary reference frame, etc. The measured stator voltage $V_{abc}$ can also be replaced by the stator voltage command $V_{abc}$*, assuming the ideality of the converter, or be calculated using the switching signals and the DC bus voltage of the PWM converter 24.

Figure 3:
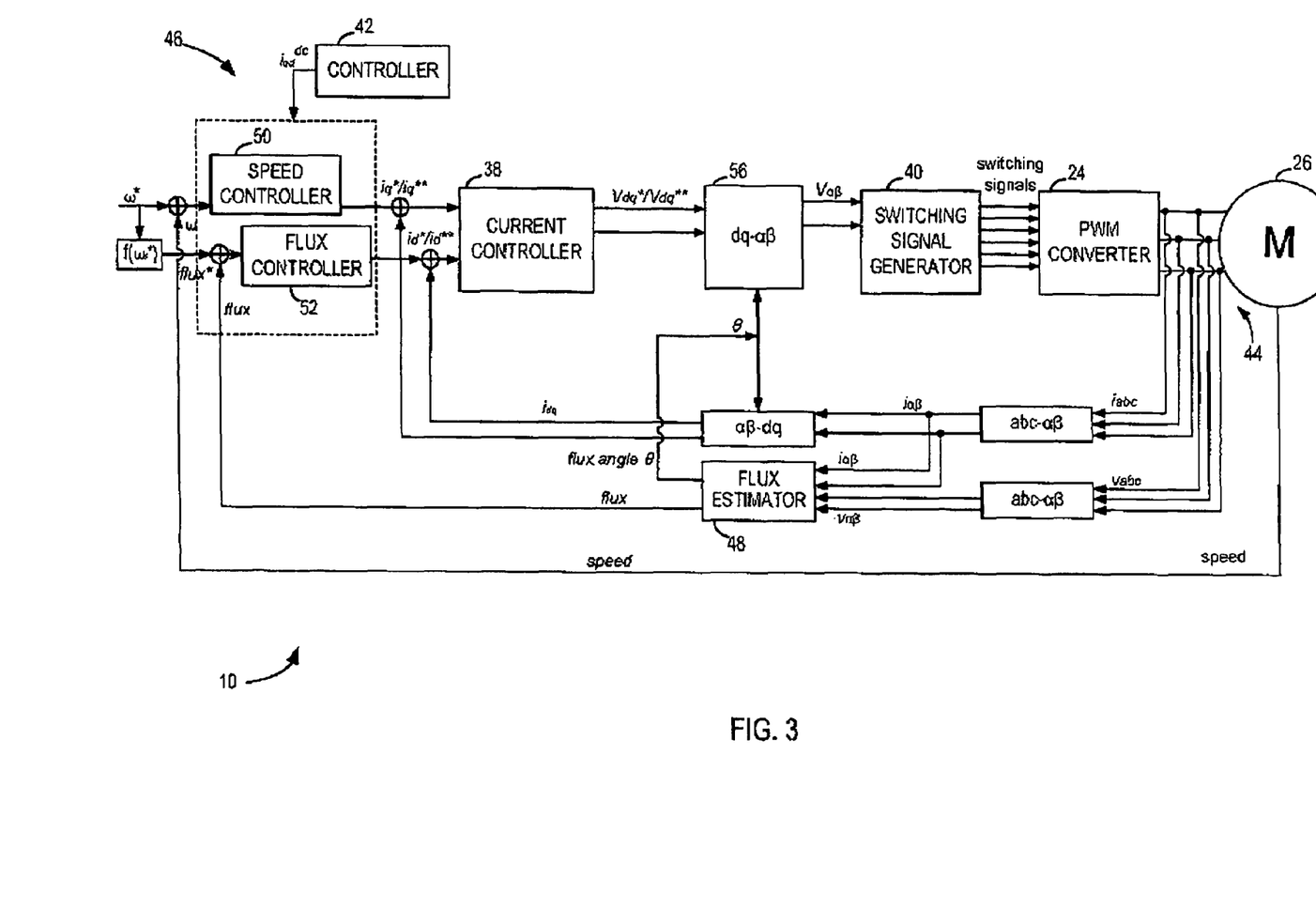
FIG. 3 is a schematic view of a field-oriented closed-loop control scheme for DC injection for the motor drive of FIG. 1 according to an embodiment of the invention.

Referring now to FIG. 3, an exemplary closed-loop control scheme for motor drive 10, a field-oriented control scheme 46, is shown according to an embodiment of the invention. In the field-oriented control scheme 46, the stator currents and voltages in the synchronous reference frame (d-q frame) are denoted as $i_q$, $i_d$, $v_q$, $v_d$, and the stator currents and voltages in the stationary reference frame (α-β frame) are denoted as $i_\alpha$, $i_\beta$, $v_\alpha$, $v_\beta$. The synchronous reference frame used in this scheme is aligned with the rotor flux with the angle θ.

As shown in FIG. 3, a flux estimator 48 in motor drive 10 estimates the rotor flux using the measured three phase currents and voltages $i_{abc}$, $v_{abc}$. Based on the estimated rotor flux and the motor speed, speed controller 50 and flux controller 52 function to generate stator current commands $i_q$* and $i_d$*, which are also respectively known as a torque command and a speed command. Current controller 38 then generates the voltage command $V_{dq}$* based on the stator current command $i_q$* and $i_d$* and the measured stator current. After reference frame transformation in transformer 56, the transformed voltage command $V_{\alpha\beta}$ is received by switching signal generator 40, which generates the switching signals for the PWM converter 24 based on the stator voltage command.

Controller 42 is configured to selectively generate a DC current command signal and introduce the DC current command signal to the current commands in the control loop. According to one embodiment of the field-oriented control scheme of motor drive 10, a DC current command is introduced to the current command in the control loop, (e.g. $i_q^*$ and $i_d^*$). In the d-q axis, the updated current commands are:

$$i_q^{**} = i_q^* - i_{dc} \times \sin(\theta)$$

$$i_d^{**} = i_d^* + i_{dc} \times \cos(\theta) \quad \text{[Eqn. 2],}$$

where $i_q^*$ & $i_d^*$ are the previous q-d axis current commands; $i_q^{}$ & $i_d^{}$ are the changed q-d axis current commands with DC signal injection; and $i_{dc}$ is the magnitude of the injected DC signal. As applied in the α-β axis, the updated current commands are:

$$i_\alpha^{**} = i_\alpha^* + i_{dc}$$

$$i_\beta^{**} = i_\beta^* \quad \text{[Eqn. 3],}$$

where $i_\alpha^*$ & $i_\beta^*$ are the previous α-β axis current commands; $i_\alpha^{}$ & $i_\beta^{}$ are the changed α-β axis current commands with DC signal injection; and $i_{dc}$ is the magnitude of the injected DC signal.

Figure 4:
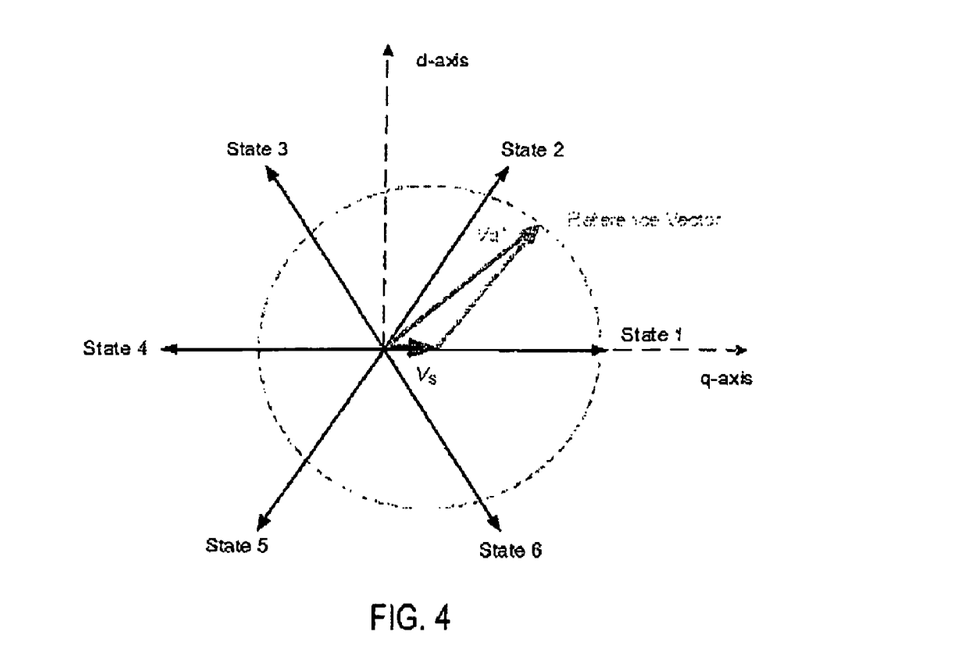
FIG. 4 is a diagram of a DC command injected into a control vector of a space vector modulation (SVM) control scheme for controlling switching in a pulse width modulation (PWM) converter according to an embodiment of the invention.

The resulting modified current command $i_q^{}$, $i_d^{}$ (or $i_\alpha^{}$ & $i_\beta^{}$) causes a change in the voltage command (from $V_{dq}^*$ to $V_{dq}^{**}$) generated by current controller 38, thus further causing a modification to the switching pattern generated by the switching signal generator 40. According to the field-oriented control scheme 46 of motor drive 10, switching signal generator 40 modifies a "standard" space vector modulation (SVM) command scheme or switching pattern in response to the modified current command (and resulting modified voltage command). As shown in FIG. 4, instead of using a normal 6-vector space command scheme for the PWM converter, an additional DC component 58 is added in the reference vector 60. In this modified space vector control, an additional q-axis component Vs 60 is added to the original reference vector Va. For example, if Va=Vq+jVd is the reference vector, the modified vector would be Va*=(Vq+Vs)+jVd. In an exemplary embodiment, the magnitude of the added Vs should be tunable between 0 and 5 volts.

Figure 5:
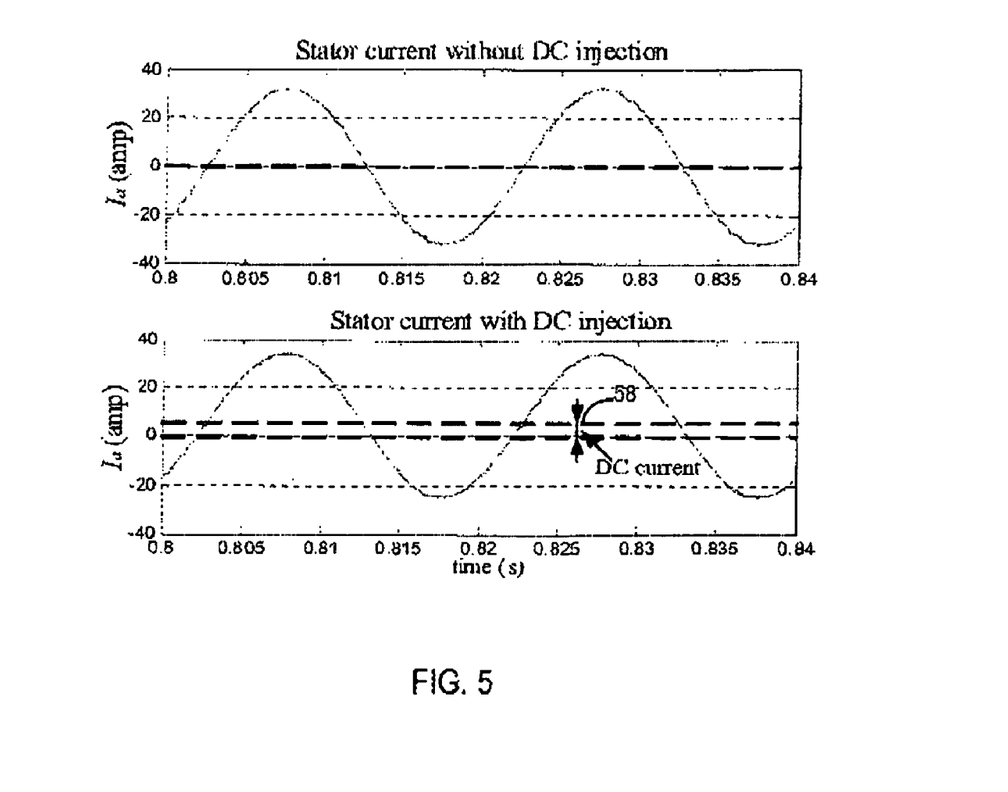
FIG. 5 is a graph of a generated stator current with and without an injected DC component for the closed-loop control scheme of FIGS. 2 and 3.

The modified space vector control generates a modified switching pattern for controlling the PWM converter 24 to inject a DC signal/component into the AC motor line voltage and phase current for the motor 26. The frequency and/or timing of switching in the PWM converter 24 is controlled according to the modified space vector control to cause a disturbance or distortion (i.e., a shift in the phase current and a notch in the line voltage) of at least one of the phases of the AC motor, which generates or injects a DC component 58 into the motor line voltages and/or phase currents, as shown in FIG. 5. These DC components can be measured and determined for each DC injection mode period by voltage and/or current sensors 44 included in motor drive 10 to determine resistance in the stator windings, as is explained in greater detail below.

Figure 6:
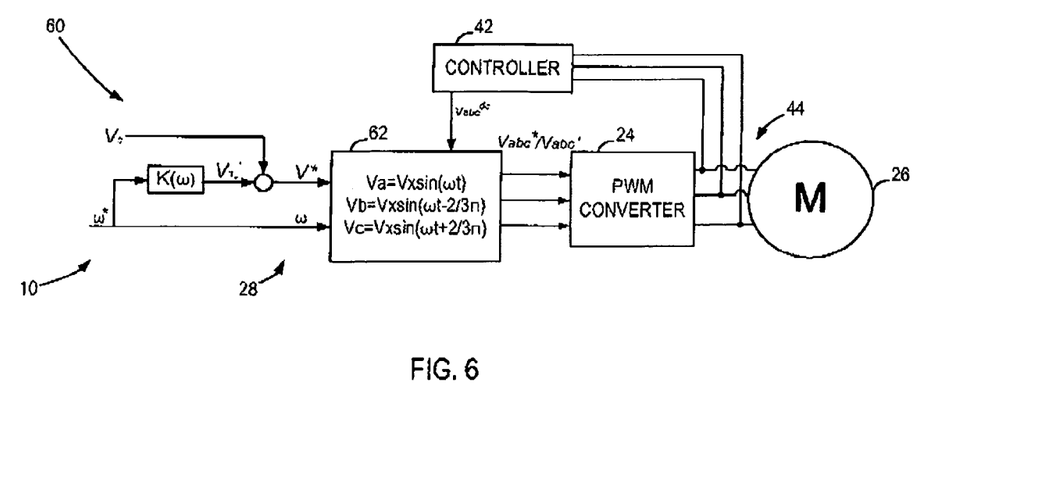
FIG. 6 is a schematic view of an open-loop control scheme for DC injection for the motor drive of FIG. 1 according to an embodiment of the invention.

According to another embodiment of the invention, motor drive 10 is operated according to an open-loop control scheme. Referring now to FIG. 6, an open-loop control scheme 60 for AC motor drive 10 is shown that, according to an exemplary embodiment, is a scalar open-loop control scheme. According to the open loop control scheme 60, control system 28 of the motor drive 10 is configured to receive a speed (or frequency) command from an input device (not shown) in order to generate a voltage magnitude command $V_1$. The voltage magnitude command $V_1$ is given by a function $K(\omega)$ of the speed command, typically referred to as a V/Hz curve. A boost voltage $V_0$, which is used to operate the motor 26 under low-speed condition, is combined with the voltage magnitude command $V_1$ to produce a voltage magnitude $V^*$.

The voltage magnitude $V^*$ and the speed command ω* are then transmitted to a voltage controller 62 and are used to generate a three phase voltage command $V_{abc}^*$, which may be represented as:

$$V_a = V \cdot \sin(\omega t)$$

$$V_b = V \cdot \sin(\omega t - 2/3 \pi)$$

$$V_c = V \cdot \sin(\omega t + 2/3 \pi) \quad \text{[Eqn. 4].}$$

The three phase voltage command $V_{abc}^*$ is given by the voltage controller 62 based on speed or frequency commands. The stator voltage command $V_{abc}^*$ is used to control switching of an array of switches in PWM converter 24. Based on a switching pattern of the switches, as determined by the stator voltage command $V_{abc}^*$, the PWM converter 24 synthesizes AC voltage waveforms with a fixed frequency and amplitude for delivery to induction motor 26.

As further shown in FIG. 6, controller 42 is configured to selectively generate a DC voltage command signal $V_{abc}^{dc}$ for transmission to the voltage controller 62, so as to switch operation of the motor drive 10 from a standard mode to DC injection mode. Upon addition of the DC voltage command signal $V_{abc}^{dc}$ by controller 42, the modified voltage command $V_{abc}'$ generated by voltage controller, described for each phase, is:

$$V_{as}' = V_{as} + 2/3 * V_{dc}$$

$$V_{bs}' = V_{bs} - 1/3 * V_{dc}$$

$$V_{cs}' = V_{cs} - 1/3 * V_{dc} \quad \text{[Eqn. 5],}$$

wherein $V_{as}$, $V_{bs}$, $V_{cs}$ are the previous voltage command without the DC bias of phase A, B, and C respectively, $V_{as}'$, $V_{bs}'$, $V_{cs}'$ are the new voltage command with the DC bias of phase A, B and C respectively, and $V_{dc}$ is the injected DC bias.

Alternatively, the modified voltage command $V_{abc}'$ generated by voltage controller can also be described with respect to the q-d reference frame as:

$$V_q' = V_q + V_{dc}$$

$$V_d' = V_d \quad \text{[Eqn. 6],}$$

wherein $V_q$, $V_d$ are the previous voltage command without the DC bias in stationary q-d reference frame; $V_q'$, $V_d'$ are the new voltage command with the DC bias in stationary q-d reference frame; $V_{dc}$ is the injected DC bias.

Figure 7:
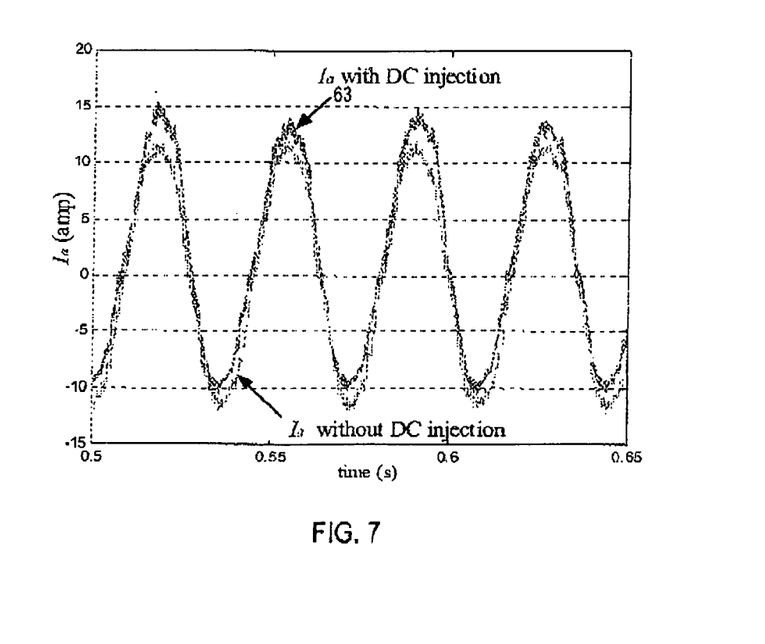
FIG. 7 is a graph of a generated stator current with and without an injected DC component for the open-loop control scheme of FIG. 6.

Based on the DC voltage command signal $V_{abc}^{dc}$ generated/added by controller 42, a modified voltage command $V_{abc}'$ as set forth in Eqn. 5 is generated by control system 28. The modified voltage command causes a modification to the switching pattern of switches in the PWM converter 24 that injects a DC signal/component into the AC motor line voltage and phase current for the motor 26. According to an exemplary embodiment of the invention, the modified switching pattern is generated by way of a modified SVM control scheme as shown in FIG. 4, in which an additional DC command/component is added in a reference vector of the SVM control scheme. The frequency and/or timing of switching in the PWM converter is controlled according to the modified switching pattern to cause a disturbance or distortion (i.e., a shift in the phase current 63 and a notch in the line voltage, as shown in FIG. 7) of at least one of the phases of the AC motor, which generates or injects a DC component into the motor line voltages and phase currents. These DC components can be measured and determined for each DC injection mode period by voltage and/or current sensors 44 (FIG. 6) included in motor drive 10.

Figure 8:
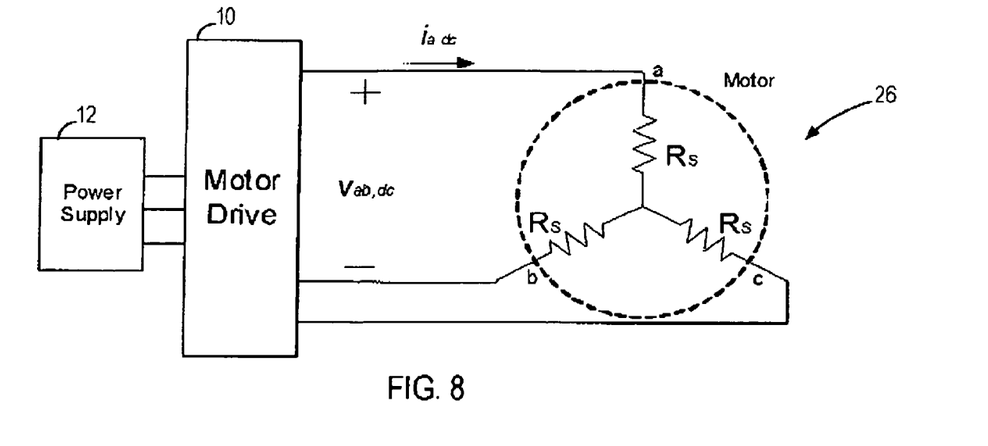
FIG. 8 is a schematic view of the DC equivalent circuit of the AC motor system of FIG. 1 when operated in DC injection mode.

Referring now to FIG. 8, an equivalent DC model of the AC motor 26 with motor drive 10 is illustrated upon injection of DC components, through either the closed-loop or open-loop control scheme thereof. Because the DC components injected in the input voltages and currents do not "pass through" the air-gap of the AC motor (i.e., the rotor/stator air-gap), they have no impact on the rotor circuit of the AC motor 10. With the DC signal injected in one of the three-phase stator currents, e.g. $i_a$, the stator resistance $R_s$ can be estimated from the DC components of the stator terminal voltages and currents as:

$$R_s = \frac{2 \cdot v_{ab}^{dc}}{3 \cdot i_a^{dc}}, \qquad [\text{Eqn. 7}]$$

where $v_{ab}^{dc}$ and $i_a^{dc}$ are the DC components of the motor line voltage $v_{ab}$ and phase current $i_a$, respectively. While Eqn. 7 shows that the phase current is measured for phase a, and that line-to-line voltage is measured between phases a and b, it is also envisioned that the phase current could be measured for a different phase and that the line-to-line voltage could be measured between phase a and a different phase. That is, the DC components of the motor line voltage and phase current are present in all phases of the AC motor.

Based on the estimated $R_s$ from DC signal injection, the stator winding temperature $T_s$ of motor 26 can be monitored. The $R_s$ variation is linearly proportional to the $T_s$ variation, as:

$$\hat{T}_s = T_{s0} + \frac{(\hat{R}_s - R_{s0})}{\alpha R_{s0}}, \qquad [\text{Eqn. 8}]$$

where $T_{s0}$ and $R_{s0}$ represents $T_s$ and $R_s$ at room temperature; $\hat{T}_s$ and $\hat{R}_s$ are the estimated $T_s$ and $R_s$ from DC signal injection; and $\alpha$ is the temperature coefficient of resistivity.

Having determined the DC components of the voltage and current, $v_{ab}^{dc}$ and $i_a^{dc}$, the stator resistance $R_s$ can be estimated according to Eqn. 7 and, accordingly, the stator winding temperature $T_s$ can then be monitored based on the determined $R_s$ according to Eqn. 8 in real-time while the AC motor is in operation. In one embodiment of the invention, controller 42 is configured to generate an alert (e.g., audible or visual alert) if the stator winding temperature exceeds a pre-determined threshold value. This alert allows an operator to take a desired action, such as shutting down the AC motor 26.

According to another embodiment of the invention, it is recognized that stator winding temperature can be estimated using only current measurements for open-loop AC drives, such as that shown in FIG. 6. Under steady state conditions (constant load and constant DC voltage command), assuming that the actually injected DC voltage is constant, the ratio of the DC current can be derived as:

$$\frac{I_{dc}}{I_{dc0}} = \frac{\frac{V_{dc}}{(R_s + R_{cable} + R_{drive})}}{\frac{V_{dc}}{(R_{s0} + R_{cable} + R_{drive})}} = \frac{R_{s0} + R_{cable} + R_{drive}}{R_s + R_{cable} + R_{drive}}, \qquad [\text{Eqn. 9}]$$

where $I_{dc}$ and $I_{dc0}$ is the measured DC current when the stator resistance is $R_s$ and $R_{s0}$, respectively.

In the case of load variation (i.e., non-steady state conditions), assuming that the change of stator winding temperature before and after load variation can be neglected, the reference DC current $I_{dc0}$ can be rescaled as, $$I'_{dc0} = \frac{I_{dc,after}}{I_{dc,before}} I_{dc0}, \qquad [\text{Eqn. 10}]$$

where $I_{dc,before}$ and $I_{dc,after}$ are the measured dc current before and after load variation, respectively; $I_{dc0}'$ is the new re-scaled reference point after load variation; $I_{dc0}$ is the previous reference point. With the re-scaled reference point, the update formulae can be kept un-changed.

Based on the above determination of the ratio of the DC current (for steady state or non-steady state loads), the stator winding temperature can be estimated. Initially, the stator resistance can be represented as:

$$R_s = I_{dc0}(R_{cable} + R_{drive} + R_{s0})/I_{dc} - R_{cable} - R_{drive} \qquad [\text{Eq. 11}].$$

$T_s$ can then be estimated, again, as, $$\hat{T}_s = T_{s0} + \frac{(\hat{R}_s - R_{s0})}{\alpha R_{s0}}, \qquad [\text{Eqn. 12}]$$

where $T_{s0}$ and $R_{s0}$ represents $T_s$ and $R_s$ at room temperature; $\hat{T}_s$ and $\hat{R}_s$ are the estimated $T_s$ and $R_s$ from DC signal injection; and $\alpha$ is the temperature coefficient of resistivity. Therefore, with the cable resistance, and drive internal resistance measured or estimated, the stator winding temperature can be monitored using only the current sensor for open-loop AC drives.

According to one embodiment, when the cable resistance $R_{cable}$ is not measurable, it can be estimated. That is, given the cable number in the American Wire Gauge (AWG) standard, $R_{cable}$ can be estimated based on the resistivity $\rho$ given by the AWG standard, the approximate length l of the cable and the ambient temperature $T_A$ as:

$$\hat{R}_{cable} = \rho l + \mu \rho l(T_A - T_0) \qquad [\text{Eqn. 13}],$$

where $\mu$ is the temperature coefficient of resistivity and $T_0$ is the room temperature, assuming that the cable temperature is the same as ambient temperature.

According to the above technique for obtaining a more accurate $R_s$ estimate (via use of stator terminal voltage and current, or current only), it is desired that larger DC voltage command signals and/or DC current command signals be introduced to increase the percentage of DC components in the motor voltages and currents. However, it is recognized that injection of the DC component causes torque pulsations in the AC motor 26. Therefore, according to an embodiment of the invention, controller 42 is programmed to inject maximal DC components into the voltage and current by introducing a maximal DC voltage/current command signal, while keeping the resulting torque pulsations under a preset tolerance range.

To determine an acceptable DC voltage/current command signal, the torque pulsations in the AC motor are analyzed. That is, the dominant components in the torque pulsations and their correlations to the injected DC components are analyzed using sequence analysis theory in a d-q reference frame. These torque pulsations are decomposed into components at multiples of the fundamental frequency, each of which can be separately monitored by observing the sequence components of the motor currents. Thus, the stator voltage, stator current, and total flux linkage are described as space vectors in the d-q stationary reference frame, and are defined as $\vec{v}_{dqs}$, $\vec{i}_{dqs}$, $\vec{\lambda}_{dqs}$ respectively.

Based on these variables, an air-gap torque, $T_{ag}$, can be calculated as the cross product of $\vec{\lambda}_{dqs}$ and $\vec{i}_{dqs}$ according to:

$$T_{ag} = \frac{P}{2} |\vec{\lambda}_{dqs} \otimes \vec{i}_{dqs}|, \quad [\text{Eqn. 14}]$$

where, P is the number of poles.

The flux and current space vectors can be decomposed into vectors at different frequencies using a Fourier Transform, as:

$$\vec{\lambda}_{dqs} = \int_{-\infty}^{+\infty} \vec{\lambda}_{dqs}^{f} df \text{ and } \vec{i}_{dqs} = \int_{-\infty}^{+\infty} \vec{i}_{dqs}^{f} df, \quad [\text{Eqn. 15}]$$

where, the superscript of each decomposed vector f indicates its rotating direction and rotating frequency in the vector space.

Assuming that the main input frequency is $\omega_e$, the major component in the total flux linkage is then $\vec{\lambda}_{dqs}^{\omega_e}$. Neglecting the other harmonics in the flux linkage, the resultant torque distortion caused by the injected DC current $\vec{i}_{dqs}^{dc}$ can be evaluated as:

$$|T_{ag}^{\omega_e}| = \frac{P}{2} |\vec{\lambda}_{dqs}^{\omega_e} \otimes \vec{i}_{dqs}^{dc}|, \quad [\text{Eqn. 16}]$$

which is oscillating at frequency $\omega_e$. The oscillating torque caused by the injected DC current leads to an oscillation of the rotor speed, approximated as:

$$|\omega_r^{\omega_e}| = \frac{|T_{ag}^{\omega_e}|}{J \cdot \omega_e}, \quad [\text{Eqn. 17}]$$

where $\omega_r^{\omega_e}$ represents the speed oscillation, and J represents the total rotation inertia of the motor system. Thus, according to the analysis of the torque pulsations in the AC motor provided by Eqns. 14-17, an acceptable DC voltage/current command signal can be determined.

It is noted that the system and method set forth above for injecting a DC component into an AC motor power supply enables online $R_s$ estimation using only the motor terminal voltages and currents (or the currents only), without the need of any other sensors, such as speed and torque transducers. Such an arrangement allows for a nonintrusive, sensorless, and low-cost technique for determining stator winding resistance in real-time while the AC motor is in operation.

Figure 9:
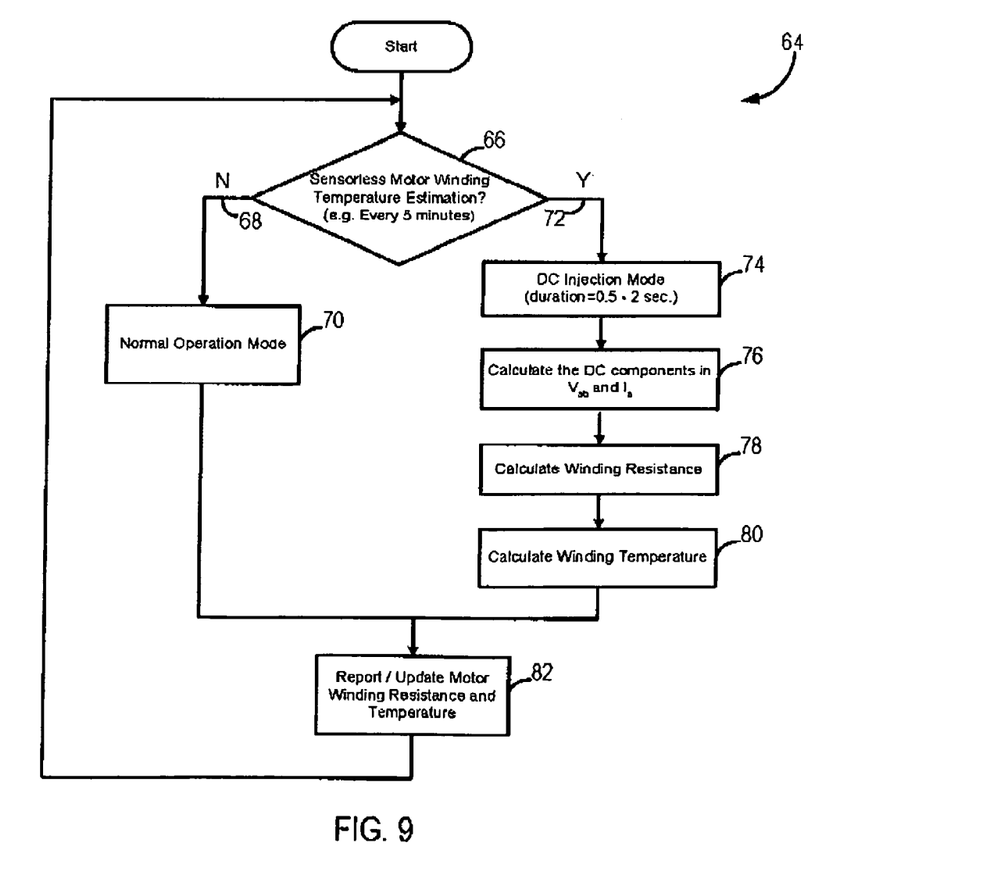
FIG. 9 is a flow chart illustrating a technique for estimating a stator winding temperature according to an embodiment of the invention.

Referring now to FIG. 9, a technique 64 for estimating stator winding temperature in the motor is set forth. The technique begins at STEP 66 with a determination of whether an estimation of the stator winding temperature is desired at that particular time. This determination can be made, for example, based on a timed interval between temperature estimations (e.g., every 5 minutes). If it is determined that no temperature estimation is desired at that time 68, then the technique moves to STEP 70 where the motor drive continues to operate in a standard mode. If, however, it is determined that a temperature estimation is desired 72, then the technique moves to STEP 74 where the motor drive is switched over to a DC injection mode, where a DC command is introduced to cause the motor drive to inject a DC signal into the motor drive output, according to one of the closed-loop and open-loop control schemes set forth in detail above.

At STEP 76, the DC components $V_{ab}$, $I_a$ in the AC motor line voltage and phase current to the induction motor are calculated. Based on the calculated motor line voltage and phase current, the resistance and the temperature of the stator winding are then determined at STEPS 78 and 80, respectively, such as set forth above in Eqns. 7 and 8. The calculated stator winding resistance and temperature can then be transmitted/reported at STEP 82 to, for example, a controller in the motor drive. The determined stator winding resistance and temperature can then be analyzed to determine if, for example, a temperature threshold for the motor has been crossed.

Figure 10:
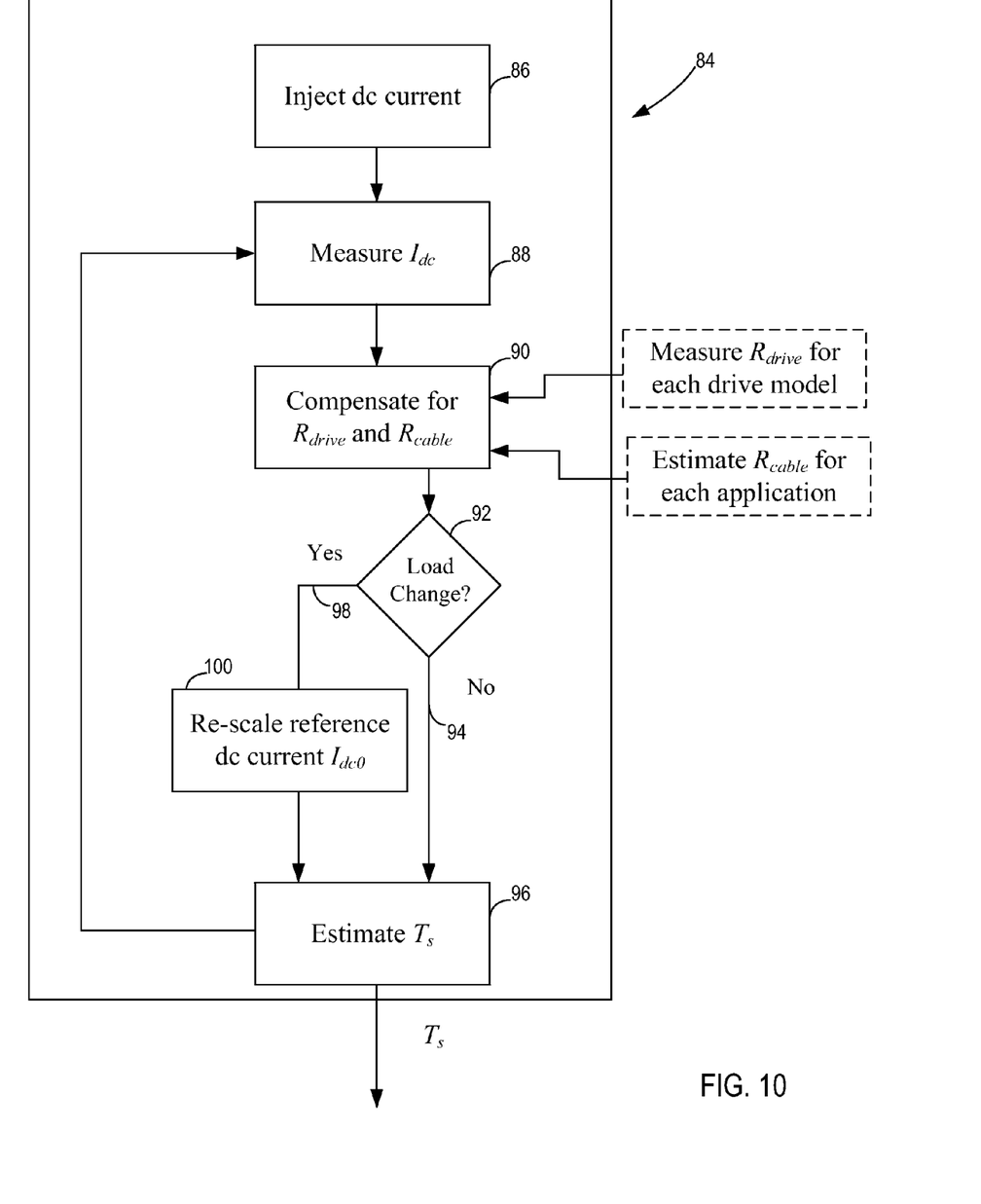
FIG. 10 is a flow chart illustrating a technique for estimating a stator winding temperature in a motor drive open-loop control scheme according to an embodiment of the invention.

Referring now to FIG. 10, a current-based technique 84 for estimating stator winding temperature in the motor is set forth, whereby only the phase current of the induction motor need be analyzed. The technique is applicable to the open-loop control technique illustrated in FIG. 6 and begins with injection of a DC signal (i.e., DC current) at STEP 86. The DC current present in the phase current of the induction motor is then measured at STEP 88, such as set forth in Eqn. 9. A compensation for the resistance of the motor drive and of the cable connecting the motor drive and motor is made at STEP 90, such as set forth in Eqn. 13 for example (based on known or estimated values for the motor drive resistance $R_{drive}$ and the cable resistance $R_{cable}$). The technique 84 then continues at STEP 92 with a determination of whether the motor load has changed. If the load has not changed 94, then the stator winding temperature is estimated at STEP 96, according to Eqns. 11 and 12. If the load has changed 98, then the reference current is re-scaled at STEP 100 (as compared to the current measured at STEP 88) as set forth in Eqn. 10. Upon this re-scaling, the stator winding temperature is then estimated at STEP 96.

Figure 11:
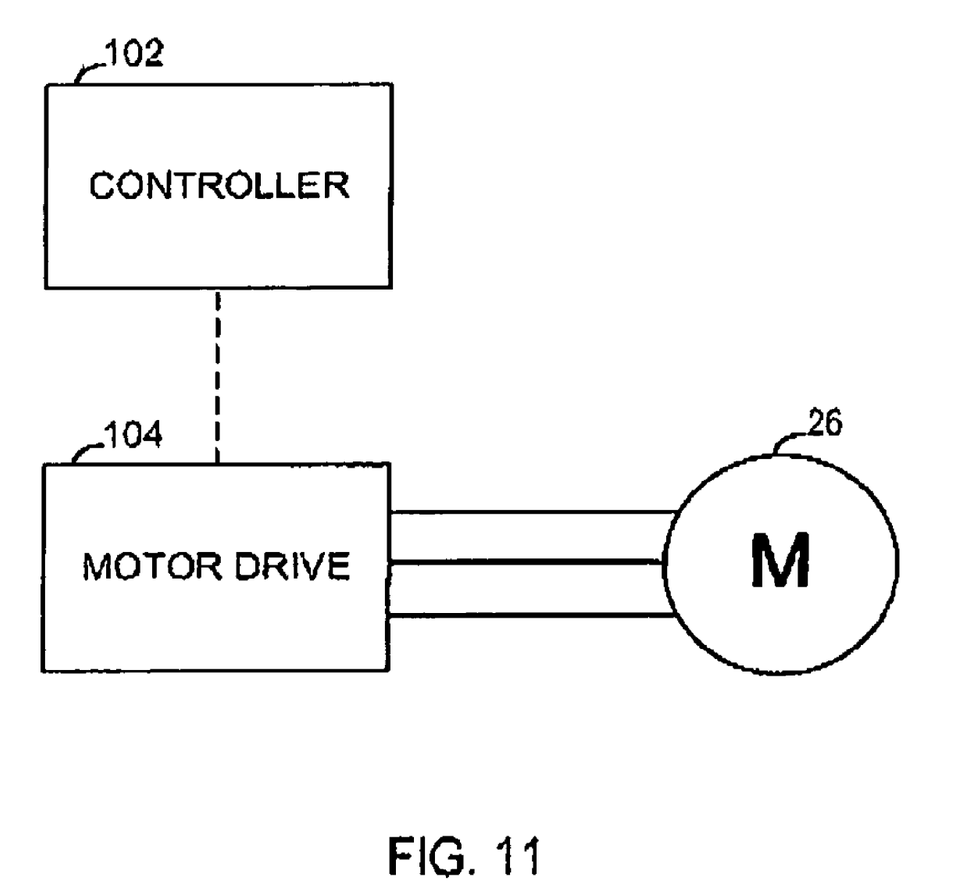
FIG. 11 is a block schematic of a controller configured to generate a DC command for transmission to a motor drive according to an embodiment of the invention.

While the motor drives described above are set forth as including controller 42 therein, it is also recognized that controller 42 can be set apart in a module/device separate from the motor drive and its associated controls. Referring now to FIG. 11, according to another embodiment of the invention, a controller 102 is shown as a device separate from a motor drive 104. Controller 102 may be integrated into a remote control or computing device configured to transmit the DC command signal to motor drive 104, such as via a wired or wireless connection. As set forth in the embodiments described in detail above, motor drive 104 may be operated according to an open-loop or closed loop control technique, and thus, according to embodiments of the invention, controller 102 may be configured to generate and transmit a DC current command signal or a DC voltage command signal, as determined by the type of control scheme used for operating motor drive 104. A DC signal is thus caused to be injected into the AC motor line voltage and phase current sent to load 26, and this DC signal is analyzed to determine a stator winding resistance.

A technical contribution for the disclosed method and apparatus is that it provides for a computer implemented technique for determining stator winding resistance for thermal protection of AC motors. The technique controls switching in a PWM converter in an AC motor drive to generate a DC component in an output of the motor drive corresponding to an input to the AC motor and determines a stator winding resistance from the DC component. A temperature of the stator windings can also be determined in the technique based on the stator winding resistance.

Therefore, according to one embodiment of the present invention, a system to estimate resistance of a stator winding of an AC motor includes an AC motor drive having an input connectable to an AC source and an output connectable to an input terminal of an AC motor. The AC motor drive further includes a pulse width modulation (PWM) converter having a plurality of switches therein to control current flow and terminal voltages in the AC motor and a control system connected to the PWM converter. The control system is configured to generate a command signal to cause the PWM converter to control an output of the AC motor drive corresponding to an input to the AC motor, selectively generate a modified command signal to cause the PWM converter to inject a DC signal into the output of the AC motor drive, and determine a stator winding resistance of the AC motor based on the DC signal of at least one of the voltage and current.

According to another embodiment of present invention, a method for determining resistance of a stator winding of an AC motor includes the step of providing an AC motor drive in series between an AC power source and the AC motor, the AC motor drive including a pulse width modulation (PWM) converter to condition voltage and current to the AC motor. The method also includes the step of selectively operating the AC motor drive in a standard mode and a DC injection mode, wherein operating the AC motor drive in the DC injection mode includes the steps of adding a DC command to at least one of an AC voltage command and an AC current command to form a composite command, generating a switching pattern for the PWM converter based on the composite command, and operating the PWM converter according to the switching pattern to introduce a DC signal into the AC motor voltage and current. Operating the AC motor drive in the DC injection mode further includes the steps of measuring the DC signal in at least one of the voltage and current provided to the AC motor and determining the resistance of the stator winding based on the measured DC signal.

According to yet another embodiment of the present invention, an AC motor drive configured to control transmission of voltage and current from an AC power source to an AC motor having a stator winding is provided. The AC motor drive includes a pulse width modulation (PWM) converter to condition an AC motor line voltage and phase current to the induction motor, the PWM converter comprising a plurality of switches and being configured to operate according to a space vector modulation (SVM) control scheme to control the plurality of switches. The AC motor drive also includes a control system configured to selectively modify the SVM control scheme for the PWM converter to inject a DC signal into the AC motor line voltage and phase current and determine the resistance of the stator winding based on the DC signal.

The present invention has been described in terms of the preferred embodiment, and it is recognized that equivalents, alternatives, and modifications, aside from those expressly stated, are possible and within the scope of the appending claims.

What is claimed is:

1. A system to estimate resistance of a stator winding of an AC motor, the system comprising:
    an AC motor drive having an input connectable to an AC source and an output connectable to an input terminal of an AC motor, the AC motor drive comprising:
        a pulse width modulation (PWM) converter having a plurality of switches therein to control current flow and terminal voltages in the AC motor; and
    a control system connected to the PWM converter and configured to:
        generate a command signal to cause the PWM converter to control an output of the AC motor drive corresponding to an input to the AC motor;
        selectively generate a modified command signal to cause the PWM converter to inject a DC signal into the output of the AC motor drive, with the control system being configured to control and set an amplitude of the injected DC signal being set such that torque pulsations in the AC motor caused by the injected DC signal are maintained within a preset tolerance range;
        decompose the torque pulsations in the AC motor into components at multiples of the fundamental frequency; and
        analyze the components of the torque pulsations and their correlation to the injected DC signal using sequence analysis theory in the d-q reference frame; and
        determine a stator winding resistance of the AC motor based on the DC signal of at least one of the voltage and current.

2. The system of claim 1 wherein the control system is further configured to:
    generate a DC voltage command signal;
    combine the DC voltage command signal with an AC voltage command signal to form the modified command signal.

3. The system of claim 2 wherein the AC motor drive comprises an open-loop motor drive.

4. The system of claim 1 wherein the control system is further configured to:
    generate a DC current command signal;
    combine the DC current command signal with a respective AC current command signal to form the modified command signal.

5. The system of claim 4 wherein the AC motor drive comprises a closed-loop motor drive.

6. The system of claim 1 wherein the control system is further configured to determine a temperature of the stator winding based on the determined stator resistance in real-time while the AC motor is in operation.

7. The system of claim 6 wherein the control system is further configured to generate an alert if the stator winding temperature exceeds a pre-determined threshold.

8. The system of claim 1 wherein the control system is configured to determine a switching pattern for the plurality of switches in the PWM converter based on the modified command signal, thereby causing injection of the DC signal into at least one phase of the AC motor.

9. The system of claim 8 wherein the control system is configured to determine a space vector modulation (SVM) control scheme to provide the switching pattern for the plurality of switches in the PWM converter.

10. The system of claim 8 further comprising voltage and current sensors therein, and wherein the control system determines an amplitude of the DC signal from a line-to-line voltage and a phase current resulting from a disturbance therein caused by the switching pattern.

11. The system of claim 8 further comprising current sensors therein, and wherein the control system determines an amplitude of the DC signal from a phase current resulting from a disturbance therein caused by the switching pattern.

12. The system of claim 1 wherein the control system is configured to:

periodically generate the modified command signal at pre-defined times during motor operation; and measure the DC signal injected at each of the plurality of pre-defined times.

13. A method for determining resistance of a stator winding of an AC motor comprising:

providing an AC motor drive in series between an AC power source and the AC motor, the AC motor drive comprising a pulse width modulation (PWM) converter to condition voltage and current to the AC motor;

selectively operating the AC motor drive in a standard mode and a DC injection mode, wherein operating the AC motor drive in the DC injection mode comprises:

adding a DC command to at least one of an AC voltage command and an AC current command to form a composite command;

generating a switching pattern for the PWM converter based on the composite command;

operating the PWM converter according to the switching pattern to introduce a DC signal into the AC motor voltage and current;

measuring the DC signal in at least one of the voltage and current provided to the AC motor; and determining the resistance of the stator winding based on the measured DC signal.

14. The method of claim 13 wherein adding the DC command comprises adding one of a DC voltage command signal and a DC current command signal.

15. The method of claim 13 wherein determining the resistance of the stator winding comprises determining the resistance of the stator winding based on the measured DC signal in the current provided to the AC motor.

16. The method of claim 13 wherein determining the resistance of the stator winding comprises determining the resistance of the stator winding based on the measured DC signal in each of the voltage and the current provided to the AC motor.

17. The method of claim 13 further comprising determining a temperature of the stator winding based on the determined resistance of the stator winding.

18. An AC motor drive to control transmission of voltage and current from an AC power source to an AC motor having a stator winding, the AC motor drive comprising:

a pulse width modulation (PWM) converter to condition an AC motor line voltage and phase current to the induction motor, the PWM converter comprising a plurality of switches and being configured to operate according to a space vector modulation (SVM) control scheme to control the plurality of switches; and a control system configured to:

analyze torque pulsations in the AC motor;

selectively modify the SVM control scheme for the PWM converter to inject a DC signal into the AC motor line voltage and phase current based on the analysis of the torque pulsations in the AC motor;

determine the resistance of the stator winding based on the DC signal;

decompose the torque pulsations in the AC motor into components at multiples of the fundamental frequency; and analyze the components of the torque pulsations and their correlation to the injected DC signal using sequence analysis theory in the d-q reference frame;

wherein the DC signal has an amplitude that maintains torqu pulsations in the AC motor within a preset tolerance range.

19. The AC motor drive of claim 18 wherein the control system is configured to introduce a DC component into a control vector to modify the SVM control scheme.

20. The AC motor drive of claim 19 wherein the DC component comprises one of a DC voltage command signal and a DC current command signal.

21. The AC motor drive of claim 18 wherein the control system is configured to determine the resistance of the stator winding based on the DC signal in the phase current.

22. The AC motor drive of claim 18 wherein the control system is configured to determine the resistance of the stator winding based on the DC signal in each of the motor line voltage and the phase current.

23. The AC motor drive of claim 18 wherein the control system is further configured to determine a temperature of the stator winding based on the determined stator resistance in real-time while the AC motor is in operation.

* * * * *

UNITED STATES PATENT AND TRADEMARK OFFICE
CERTIFICATE OF CORRECTION

| | | |
|---|---|---|
| PATENT NO. | : 8,384,338 B2 | Page 1 of 1 |
| APPLICATION NO. | : 12/363413 | |
| DATED | : February 26, 2013 | |
| INVENTOR(S) | : Lu et al. | |

It is certified that error appears in the above-identified patent and that said Letters Patent is hereby corrected as shown below:

In the Claims:

Col. 14, line 10 (Claim 1), delete "DC signal being set such" and
substitute therefore -- DC signal such --.

Col. 15, line 13 (Claim 13), after "AC motor drive in the DC injection mode
comprises:" add the following:
-- analyzing torque pulsations in the AC motor; --; and Col. 15, line 15 (Claim 13), delete "command to form a" and
substitute therefore -- command based on the analysis of the torque pulsations
in the AC motor and so as to form a --; and Col. 15, line 16 (Claim 13), delete "composite command;" and
substitute therefore -- composite command, with the added DC command
configured to maintain the torque pulsations in the AC motor within a preset
tolerance range; --.

Col. 16, line 23 (Claim 18), delete "torqu pulsations" and
substitute therefore -- torque pulsations --.

Signed and Sealed this
Twenty-eighth Day of May, 2013

Teresa Stanek Rea
*Acting Director of the United States Patent and Trademark Office*